(12) United States Patent
Shigetomi

(10) Patent No.: US 9,186,756 B2
(45) Date of Patent: Nov. 17, 2015

(54) REPAIR METHOD AND REPAIR STRUCTURE FOR HONEYCOMB SANDWICH STRUCTURAL BODY

(71) Applicant: MITSUBISHI AIRCRAFT CORPORATION, Aichi (JP)

(72) Inventor: Toshikazu Shigetomi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/361,478

(22) PCT Filed: Nov. 22, 2012

(86) PCT No.: PCT/JP2012/007538
§ 371 (c)(1),
(2) Date: May 29, 2014

(87) PCT Pub. No.: WO2013/108328
PCT Pub. Date: Jul. 25, 2013

(65) Prior Publication Data
US 2014/0329043 A1    Nov. 6, 2014

(30) Foreign Application Priority Data

Jan. 19, 2012    (JP) .................................. 2012-008562

(51) Int. Cl.
*B32B 3/12*    (2006.01)
*B23P 6/00*    (2006.01)
(Continued)

(52) U.S. Cl.
CPC . *B23P 6/00* (2013.01); *B29C 73/06* (2013.01); *B29C 73/10* (2013.01); *B32B 3/08* (2013.01); *B32B 3/12* (2013.01); *B32B 5/24* (2013.01); *B32B 7/12* (2013.01); *F02C 7/045* (2013.01); *B32B 2250/02* (2013.01); *B32B 2260/023* (2013.01); *B32B 2260/046* (2013.01); *B32B 2262/101* (2013.01); *B32B 2262/106* (2013.01); *B32B 2307/51* (2013.01); *B32B 2307/714* (2013.01); *B32B 2605/00* (2013.01);
(Continued)

(58) Field of Classification Search
CPC ............ Y10T 428/20; Y10T 29/49732; Y10T 29/49734; B23P 6/00; B29C 73/06; B29C 73/10; B32B 3/12
USPC ................................................ 428/63; 159/98
See application file for complete search history.

(56) References Cited

FOREIGN PATENT DOCUMENTS

| JP | 2001-038838 A | 2/2001 |
| JP | 2007-313895 A | 12/2007 |

(Continued)

OTHER PUBLICATIONS

International Search Report for Application No. PCT/JP2012/007538 dated Jan. 8, 2013.

*Primary Examiner* — Alexander Thomas
(74) *Attorney, Agent, or Firm* — Pearne & Gordon LLP

(57) ABSTRACT

A repair method includes the steps of: (A) forming a repair cavity 14 by removing a honeycomb core 11 including a damaged portion with a front-side skin 12; (B) inserting, into the repair cavity 14, a repair honeycomb core 21 whose end surface 30 on a side to which a repair patch 22 is bonded is subjected to flattening treatment; (C) disposing the repair patch on the flattened end surface 30 of the repair honeycomb core 21 via a film-like adhesive 24; and (D) bonding the repair honeycomb core 21 to an existing portion of the honeycomb sandwich structural body 10 and to the repair patch 22, and curing the repair patch 22 under a reduced-pressure atmosphere associated with heating.

6 Claims, 6 Drawing Sheets

(51) Int. Cl.
 F02C 7/045 (2006.01)
 B29C 73/06 (2006.01)
 B29C 73/10 (2006.01)
 B32B 3/08 (2006.01)
 B32B 5/24 (2006.01)
 B32B 7/12 (2006.01)
 F02K 1/82 (2006.01)
(52) U.S. Cl.
 CPC ............ *F02K 1/827* (2013.01); *F05D 2230/80* (2013.01); *F05D 2250/283* (2013.01); *Y02T 50/672* (2013.01); *Y10T 29/49732* (2015.01); *Y10T 428/20* (2015.01)

(56) References Cited

FOREIGN PATENT DOCUMENTS

| | | |
|---|---|---|
| JP | 2008-002461 A | 1/2008 |
| JP | 2009-512570 A | 3/2009 |
| JP | 2010-285098 A | 12/2010 |

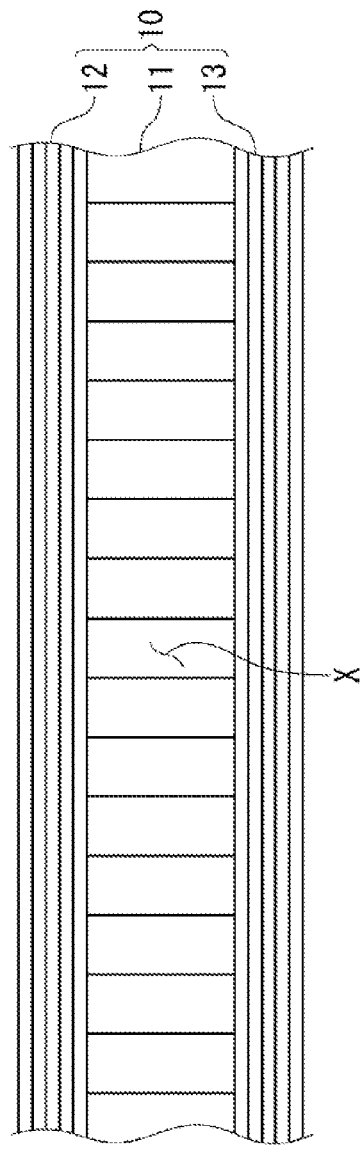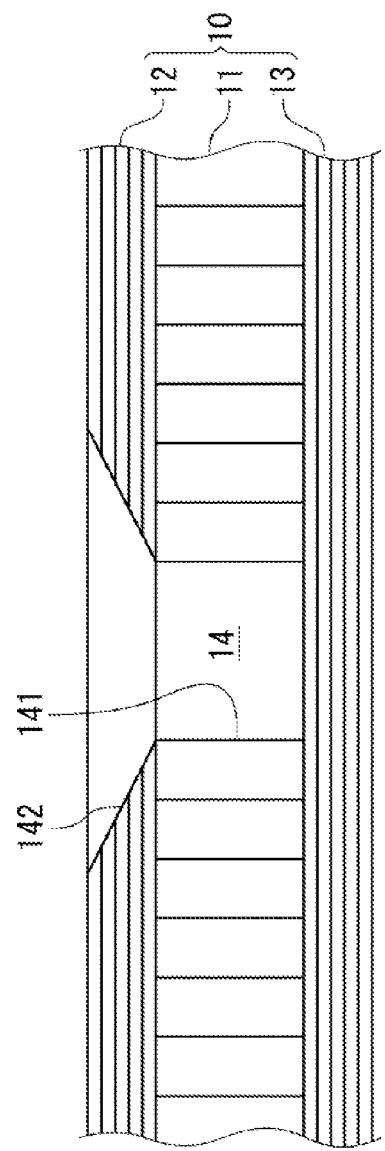
FIG. 1A
FIG. 1B

REPAIR METHOD AND REPAIR STRUCTURE FOR HONEYCOMB SANDWICH STRUCTURAL BODY

TECHNICAL FIELD

The present invention relates to a method for repairing a structural body including fiber reinforced plastics for use to constitute an aircraft, a vessel, a vehicle or the like.

BACKGROUND ART

A honeycomb sandwich structural body including a front-side skin and a rear-side skin bonded to the front and rear sides of a honeycomb core is known as a composite structural body using fiber reinforced plastics. The front-side skin and the rear-side skin are respectively obtained by laminating and curing sheets of fiber reinforced plastics.

Patent Literature 1 discloses a repair method employed when the honeycomb core of the sandwich structural body is damaged. In Patent Literature 1, the honeycomb core in a damaged portion is removed with the front-side skin (or the rear-side skin) to form a repair cavity. After that, a repair honeycomb core is inserted into the cavity, and a repair patch is placed on the repair honeycomb core via an adhesive. The repaired portion is cured by heating and pressurizing.

CITATION LIST

Patent Literature

Patent Literature 1: Japanese Patent Application Laid-Open No. 2007-313895

SUMMARY OF INVENTION

Technical Problem

However, it has been found that voids exist within the repair patch that becomes a skin after repair when the above repair method is employed. If voids exist, desired properties may not be obtained for the repaired portion.

Thus, an object of the present invention is to provide a repair method and a repair structure capable of preventing the occurrence of voids in a skin composed of a repair patch when a honeycomb sandwich structural body is repaired using a repair honeycomb core and the repair patch.

Solution to Problem

The present inventor has found the following facts by investigating a cause of the occurrence of voids in a skin corresponding to a repair patch.

(1) Air or another gas component exists between fiber reinforced plastic sheets in a repair patch in an uncured state before heating and curing. To remove the gas component from the repair patch, a considerable compressive pressure needs to be applied in a sheet laminating direction of the repair patch.

(2) When a honeycomb sandwich structural body is newly produced, the honeycomb sandwich structural body can be heated and pressurized by using an autoclave. Thus, a pressure high enough to remove the gas component from the repair patch can be applied. However, when the honeycomb sandwich structural body is repaired on site, a portion to be repaired needs to be surrounded by a bag film, and heated with an inner portion decompressed. Thus, a pressure only up to an atmospheric-pressure level can be applied.

(3) In a portion surrounded by the bag film, a reaction from a repair honeycomb core in contact with the repair patch via an adhesive becomes a pressure on the repair patch. However, since an end surface of the (repair) honeycomb core is a concave-convex surface where a plurality of pores open, the repair patch hardly receives the reaction from an opening portion (a concave portion), resulting in a pressure loss in the end surface. Therefore, when only the pressure up to the atmospheric-pressure level can be applied, the repair patch cannot be sufficiently pressurized, and the gas component is insufficiently removed to become voids, which remain in a repaired skin.

Thus, the present inventor has achieved the following invention featured in that the repair patch is bonded to the end surface of the repair honeycomb core after the end surface of the repair honeycomb core is made flat by, for example, closing the openings in the end surface of the repair honeycomb core.

That is, a method for repairing a honeycomb sandwich structural body where a skin is disposed on both front and rear surfaces of a honeycomb core according to the present invention includes the steps of:

(A) forming a repair cavity by removing the honeycomb core including a damaged portion with the skin;

(B) inserting, into the repair cavity, a repair honeycomb core whose end surface on a side to which a repair patch is bonded is subjected to flattening treatment;

(C) disposing the repair patch on the flattened end surface of the repair honeycomb core via an adhesive; and (D) bonding the repair honeycomb core to an existing portion of the honeycomb sandwich structural body and to the repair patch, and curing the repair patch under a reduced-pressure atmosphere associated with heating.

In accordance with the repair method of the present invention, since the repair honeycomb core whose end surface on the side on which the repair patch is disposed is subjected to the flattening treatment is used, the repair patch can receive a reaction of the repair honeycomb core from the flat surface without any loss. Therefore, even a pressure at about an atmospheric-pressure level can sufficiently release a gas component from the repair patch. Voids can be thereby prevented from remaining in a repaired skin.

It is practical to employ at least two methods described below as the flattening treatment in the repair method of the present invention. In the two methods, a method (a) of closing an opening with an adhesive is more preferable than a method (b) in terms of costs.

In the method (a), an opening of the repair honeycomb core is closed with resin that is not softened by heating in the step (D).

In the method (b), a fiber reinforced plastic sheet equivalent to a sheet constituting the repair patch is bonded to the end surface on the side on which the repair patch is disposed.

To execute the method (a), the opening of the repair honeycomb core is preferably closed by immersing, in resin in an uncured state, the end surface of the repair honeycomb core on the side on which the repair patch is disposed, and then curing the resin so as to easily perform the flattening treatment.

A repair structure of a honeycomb sandwich structural body where a skin is disposed on both front and rear surfaces of a honeycomb core described below is provided by the above repair method according to the present invention. That is, in the repair structure, in a repair cavity including a first region formed by removing the skin, and a second region formed by removing the honeycomb core, a repair honeycomb core disposed in the second region and a repair patch disposed in the first region are bonded to each other, and an end surface of the repair honeycomb core on a side to which the repair patch is bonded is made flat.

In the repair structure, an adhesive may be interposed between the repair honeycomb core and the repair patch. An opening in the end surface of the repair honeycomb core is preferably closed with resin.

Advantageous Effects of Invention

In accordance with the present invention, since the repair honeycomb core whose end surface on the side on which the repair patch is disposed is subjected to the flattening treatment is used, the repair patch can receive a reaction of the repair honeycomb core from the flat surface without any loss. Therefore, even a pressure at about an atmospheric-pressure level can sufficiently release a gas component from the repair patch. Voids can be thereby prevented from remaining in a repaired skin.

BRIEF DESCRIPTION OF DRAWINGS

FIGS. 1A and 1B show repair steps of a honeycomb sandwich structural body according to a present embodiment: FIG. 1A is a sectional view of the structural body before repair; and FIG. 1B is a sectional view of the structural body where a repair cavity is formed by removing a repair target including a damaged portion;

FIG. 4A is a partial plan view before closing the end surface; FIG. 4B is a partial sectional view after closing the end surface; and FIG. 4C is a partial sectional view after closing the end surface;

DESCRIPTION OF EMBODIMENTS

Figure 2:
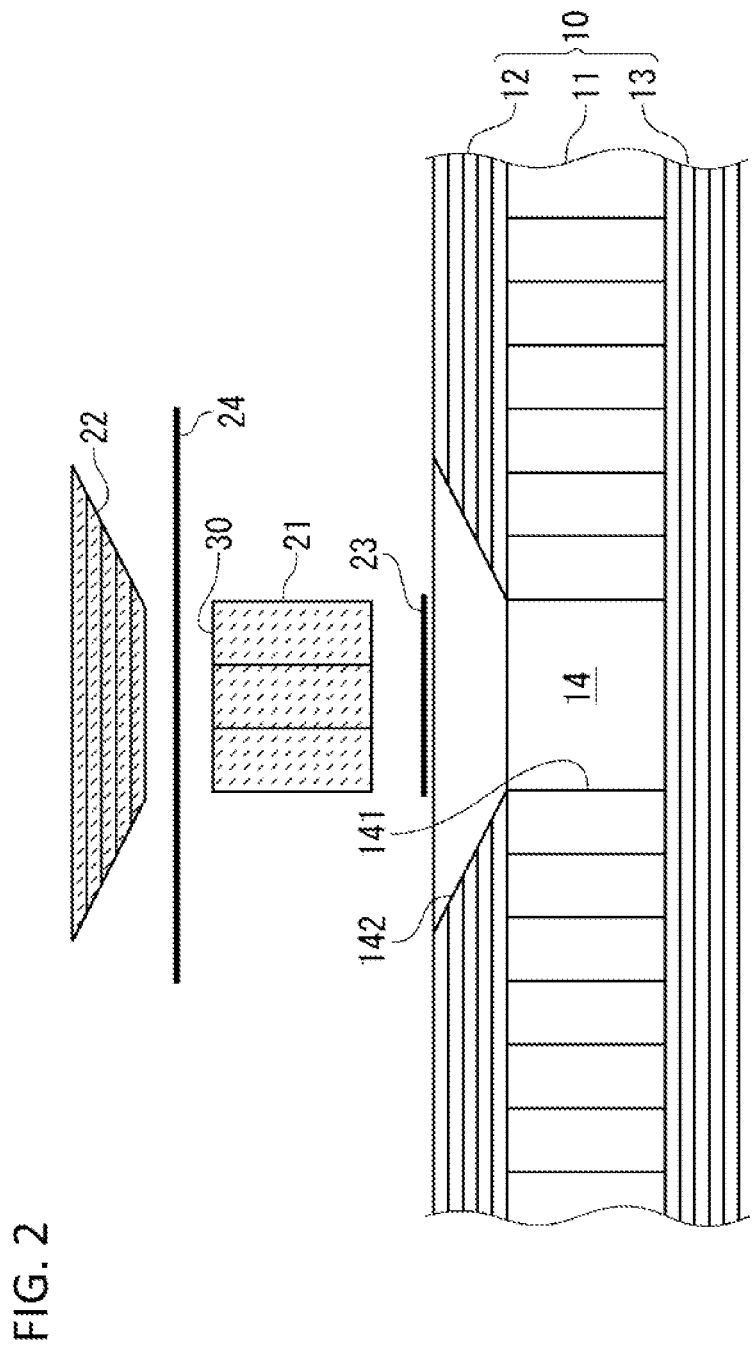
FIG. 2 shows a step subsequent to FIGS. 1A and 1B, and is a sectional view illustrating a repair honeycomb core and a repair patch to be disposed in a position to be repaired in relation to the structural body.

In the following, the present invention is described in detail based on an embodiment shown in the accompanying drawings.

In the present embodiment, a method for repairing an target portion including a damage x and its surrounding region when the damage x is formed in a portion of a honeycomb core 11 of a honeycomb sandwich structural body 10 as shown in FIGS. 1A and 1B is described.

The honeycomb sandwich structural body 10 includes the honeycomb core 11, and a front-side skin 12 and a rear-side skin 13 bonded to both front and rear surfaces of the honeycomb core 11. The honeycomb sandwich structural body 10 employs a laminate structure of the lightweight honeycomb core 11, and the front-side skin 12 and the rear-side skin 13 having a high strength, and is thus often used for aircraft parts or the like which are required to be lightweight and have a high strength.

As is well known, the honeycomb core 11 has a form in which a plurality of pores open in both end surfaces in a honeycomb shape, and is made of aluminum alloy, resin or the like.

The front-side skin 12 and the rear-side skin 13 are formed of fiber reinforced plastics (FRP). For example, carbon fiber or glass fiber is used as reinforcement fiber. Especially, carbon fiber reinforced plastics (CFRP) using carbon fiber as reinforcement fiber have a high strength, a high modulus of elasticity, and excellent corrosion resistance as compared to other FRPs.

In the honeycomb sandwich structural body 10, prepregs, which are precursors of the front-side skin 12 and the rear-side skin 13, are laminated on the front and rear sides of the honeycomb core 11 via a resin adhesive (thermosetting resin). The prepreg is formed by laminating a plurality of sheet-like members made of carbon fiber impregnated with uncured resin. A laminate of the honeycomb core 11 and the prepregs are put into an autoclave, and the resin is cured at high temperature and high pressure. The honeycomb sandwich structural body 10 is thereby produced. The honeycomb sandwich structural body 10 may be also produced by laminating and curing only the prepregs in the autoclave, and thereafter bonding the prepregs to the front and rear sides of the honeycomb core 11 by adhesion.

[Repair Cavity Forming Step]

When the honeycomb sandwich structural body 10 having the damage x is repaired, a repair cavity 14 is formed by removing a portion to be repaired as shown in FIG. 1B.

The portion to be repaired is mechanically removed by cutting, grinding, or any other well-known mechanical methods.

The repair cavity 14 includes a conical trapezoidal repair cavity 142 (a first region) formed by removing the front-side skin 12, and a columnar repair cavity 141 (a second region) formed by removing the honeycomb core 11. Because of the above shape of the repair cavity 142, the front-side skin 12 in an existing portion has a tapered opening surface whose inner diameter gradually decreases from a front surface toward a rear surface thereof. This is to avoid stress concentration in a joint interface with a prepreg (a repair patch). The shape of the repair cavity 14 is merely one preferred example of the present invention.

[Repair Member Inserting Step]

A repair honeycomb core 21 and a repair patch 22 are inserted into the repair cavity 14 as shown in FIG. 2. A honeycomb core having equivalent properties to those of the removed honeycomb core 11 is prepared as the repair honeycomb core 21. The repair honeycomb core 21 does not always need to be made of the same material as the removed honeycomb core 11. The dimensions thereof are determined in consideration of an adhesive applied around the repair honeycomb core 21 or the like.

The repair patch 22 is composed of the prepreg of fiber reinforced plastics. The prepreg has been already described above. In the repair patch 22, the resin (the adhesive) is in an uncured state. The material of the repair patch 22 is also not specifically limited as long as the repair patch 22 has equivalent properties to those of the removed front-side skin 12 after curing. The repair patch 22 has a tapered shape corresponding to the tapered shape of the front-side skin 12 in the existing portion.

A film-like adhesive 23 is disposed between the repair honeycomb core 21 and the rear-side skin 13. A film-like adhesive 24 is also disposed between the repair honeycomb core 21 and the repair patch 22. It goes without saying that an adhesive may be also interposed between the periphery of the repair honeycomb core 21 and the honeycomb core 11 in the existing portion. The adhesives are made of thermosetting resin.

The repair honeycomb core 21 of the present embodiment is featured in that an end surface 30 on which the repair patch 22 is placed via the film-like adhesive 24 is subjected to flattening treatment. The flattening treatment is described after describing the repair steps to the end.

[Heating and Curing Step]

Figure 3:
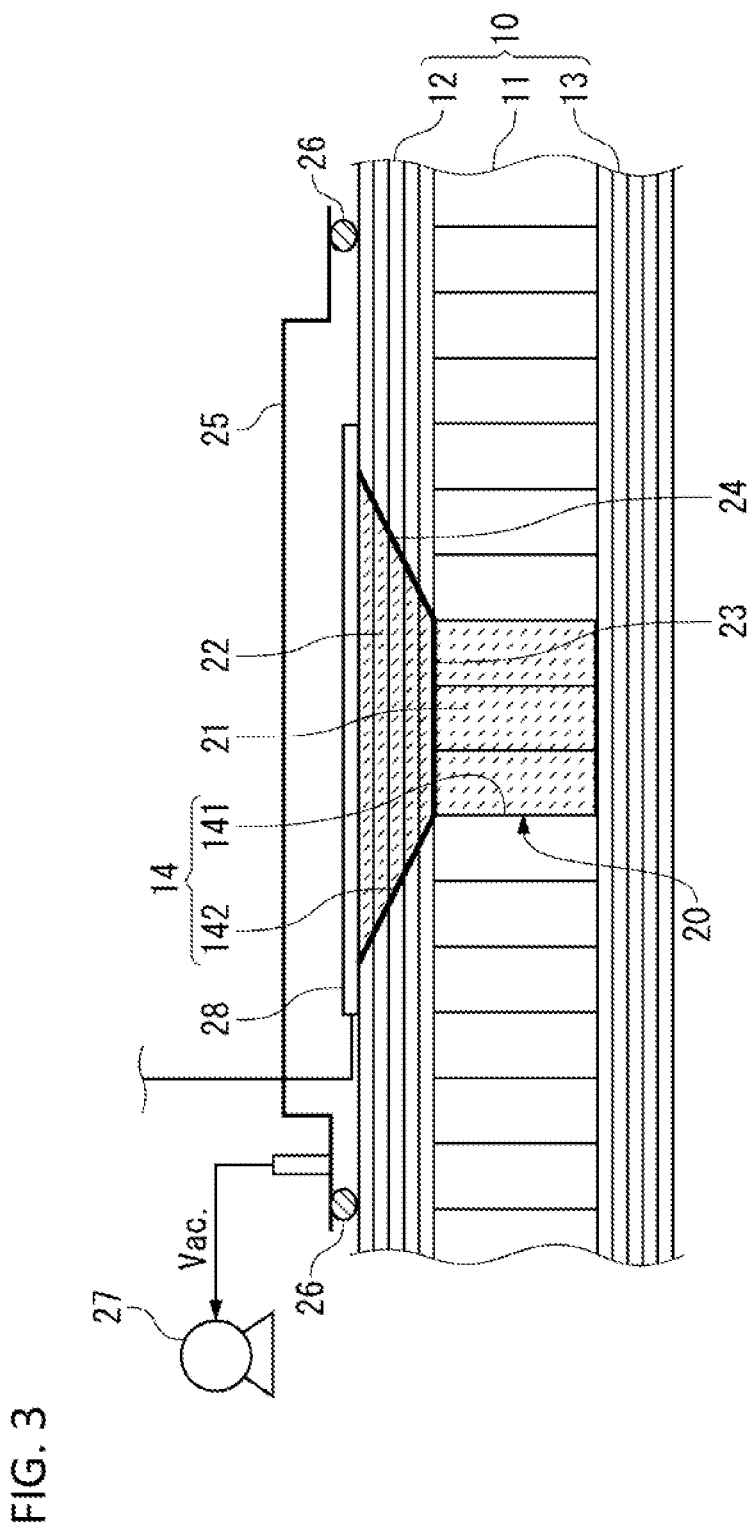
FIG. 3 shows a step subsequent to FIG. 2, and is a sectional view illustrating a state in which the repair honeycomb core and the repair patch are disposed in the position to be repaired and heated under a reduced-pressure atmosphere.

After the repair honeycomb core 21 and the repair patch 22 are inserted and placed in the repair cavity 14, a bag film 25 having a size large enough to surround the repair cavity 14 (the repair honeycomb core 21 and the repair patch 22) is bonded to the front-side skin 12 in the existing portion via a seal material 26 at its periphery as shown in FIG. 3. An inner portion of the bag film 25 is thereby sealed.

A vacuum unit 27 is provided in communication with a region sealed by the bag film 25. A heater mat 28 is also installed so as to cover the entire repair patch 22. An electrically-heated wire is embedded in the heater mat 28. The heater mat 28 is heated by an external power source (not shown).

The region is evacuated by operating the vacuum unit 27, and also heated by supplying electricity to the heater mat 28. The bag film 25 thereby deflates, and an atmospheric pressure is applied to the repair honeycomb core 21 and the repair patch 22. The resin included in the prepreg constituting the repair patch 22, and the film-like adhesives 23 and 24 are cured. Heating using the heater mat 28 is continued for a required length of time. The repair is thereby completed. The repair honeycomb core 21 is bonded to the rear-side skin 13 and the honeycomb core 11 in the existing portion, and the repair patch 22 is bonded to the repair honeycomb core 21, and the front-side skin 12 in the existing portion by adhesion. A repair structure 20 is thereby formed in the honeycomb sandwich structural body 10.

[Flattening Treatment Step]

As described above, the end surface 30 of the repair honeycomb core 21 is subjected to the flattening treatment in the present embodiment.

Figure 4A:
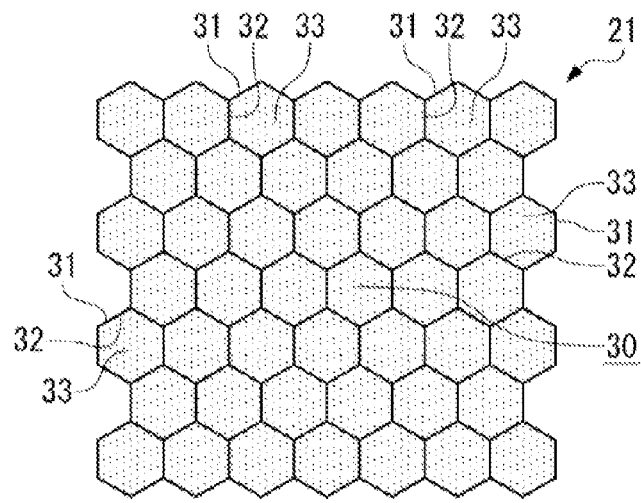
FIGS. 4A to 4C show an end surface of the repair honeycomb core in a method for repairing the honeycomb sandwich structural body according to the present embodiment.

The repair honeycomb core 21 (the honeycomb core 11) has a structure in which a plurality of cells 31 each having, for example, a hexagonal shape are aggregated as shown in FIG. 4A. A hexagonal pore 32 passing through in an axial direction of the cells 31 is formed in each of the cells 31. The pore 32 opens in the end surface 30 of the repair honeycomb core 21. As described above, a received pressure does not become a reaction, but is lost in the opening region. Thus, a sufficient pressure is not applied to the repair patch 22, so that a gas component is not sufficiently removed. In the present embodiment, the flattening treatment described below is performed on the end surface 30.

Figure 4B:
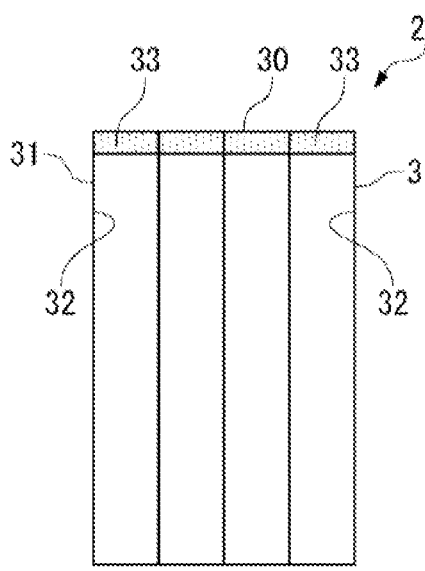

The flattening treatment in the present embodiment is performed by closing the pores 32 opening in the end surface 30 with plugs 33 made of resin to eliminate concavities and convexities, and thereby forming the end surface 30 into a flat surface, as shown in FIGS. 4A and 4B. Accordingly, the loss in reaction in the opening region is eliminated, and thus the repair patch 22 can receive a reaction from the entire end surface 30 without any loss.

Since the plugs 33 are provided in order to form the flat surface by closing the openings, it is not necessary for the plugs 33 to reach deep into the pores 32 from the end surface 30. The plugs 33 only need to close the openings in a range of about 5 mm from the end surface 30.

Figure 5A:
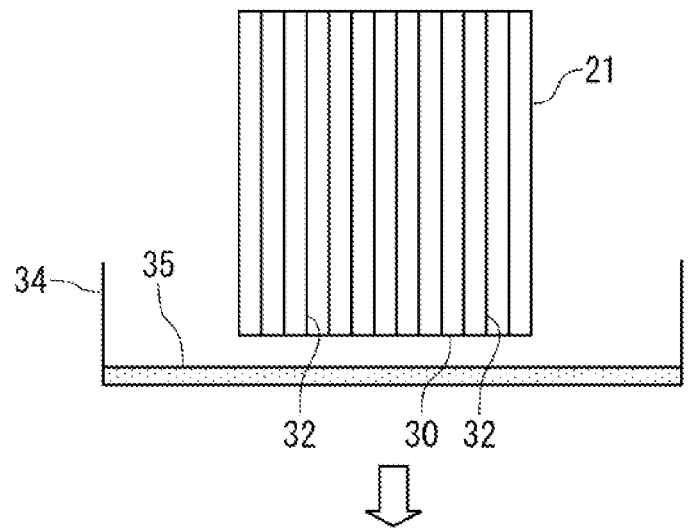
FIGS. 5A to 5C are views illustrating steps of closing openings in the end surface of the repair honeycomb core with an adhesive.
Figure 5B:
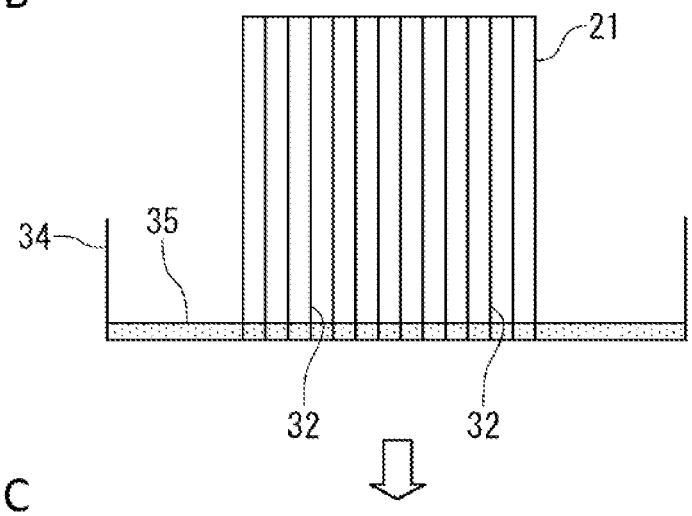
Figure 5C:
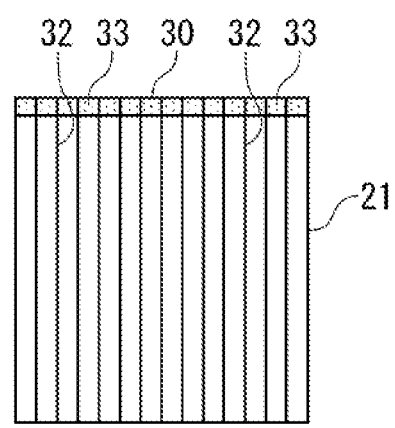

While various methods can be employed for closing the openings of the pores 32 with the plugs 33, a preferred method is described based on FIGS. 5A to 5C.

Resin 35 that is cured to become the plugs 33 is stored in a container 34 as shown in FIG. 5A.

After disposing the repair honeycomb core 21 such that the end surface 30 as an object of the flattening treatment faces the resin 35 in the container 34 (FIG. 5A), the end surface 30 is immersed in the resin 35 (FIG. 5B).

The resin 35 is easily fed into the pores 32 through the openings because of a capillary action of the pores 32 as well. Here, the end surface 30 may be abutted against a bottom of the container 34 or may be located away from the bottom.

Ultraviolet-curing resin as well as thermosetting resin may be used as the resin 35 as long as the resin is not softened and melted in the heating and curing step.

After the resin 35 is fed into the pores 32 including the openings, the resin 35 is cured. After curing, the repair honeycomb core 21 is pulled up from the container 34 (the resin 35). The repair honeycomb core 21 where the openings of the pores 32 are closed with the plugs 33 is thereby obtained (FIG. 5C). Mechanical processing may be performed to remove burrs of the cured resin 35 or adjust the shape of the end surface 30.

Here, the resin 35 may be cured with the end surface 30 immersed in the resin 35, or after pulling up the repair honeycomb core 21 (the end surface 30) from the resin 35.

Figure 4C:
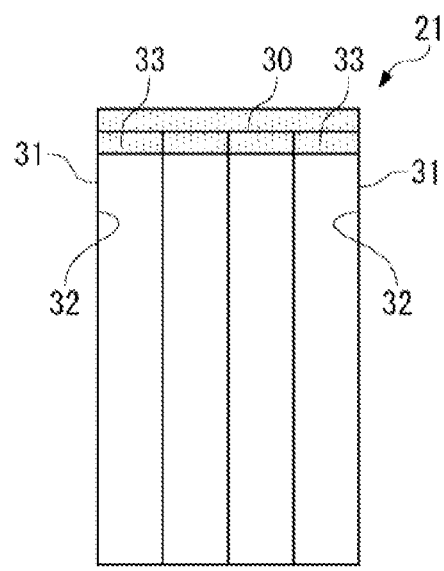

The plugs 33 may be formed flush with the end surface 30 as shown in FIG. 4B, or may be formed over the end surface 30, that is, formed projecting from the end surface 30 as shown in FIG. 4C. The end surface 30 may be immersed in the resin 35 in abutment against the bottom of the container 34 so as to obtain the form in FIG. 4B. The end surface 30 may be immersed in the resin 35 away from the bottom of the container 34 so as to obtain the form in FIG. 4C. In either form, there is no difference in the effect of the present invention. In consideration of the property that the honeycomb core is lightweight, the form in FIG. 4B is preferably employed so as to reduce an extra weight.

[Effect]

As described above, the loss in reaction in the opening region can be eliminated by closing the openings of the pores 32 with the plugs 33 made of resin in the present embodiment. Therefore, since the repair patch 22 receives the reaction from the entire end surface 30 without any loss in the heating and curing step, even when the atmospheric pressure is applied, the gas component can be sufficiently removed from the repair patch 22. The occurrence of voids can be thereby reduced.

Since the simple method of curing the resin 35 after immersing the end surface 30 in the resin 35 is employed for closing the openings of the pores 32 with the plugs 33 in the present embodiment, the repair structure 20 where the occurrence of voids is reduced can be obtained at low cost.

Although the embodiment of the present invention has been described above, the constitutions described in the embodiment described above may be freely selected or changed into other constitutions without departing from the scope of the present invention.

For example, to feed the resin 35 into the pores 32, the end surface 30 as the object of the flattening treatment may be directed upward, and the resin 35 may be evenly fed therein. Precursor resin of the plugs 33 formed into such a shape as to be inserted into the pores 32 may be inserted into the pores 32.

Figure 6A:
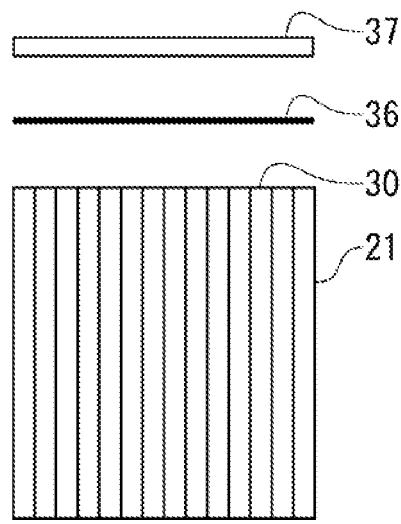
FIGS. 6A and 6B are views for explaining another method for closing the openings in the end surface of the repair honeycomb core.
Figure 6A:
Figure 6B:
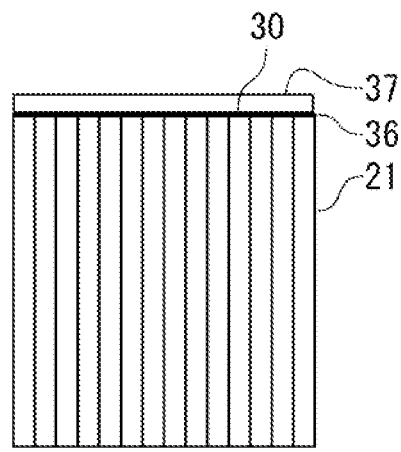

The flattening treatment may be also performed by bonding a prepreg 37 to the end surface 30 via a film-like adhesive 36 as shown in FIGS. 6A and 6B.

REFERENCE SIGNS LIST

10 honeycomb sandwich structural body
11 honeycomb core
12 front-side skin
13 rear-side skin
14 repair cavity
20 repair structure
21 repair honeycomb core
22 repair patch
23, 24, 36 adhesive
25 bag film
26 seal material
27 vacuum unit
28 heater mat
30 end surface
31 cell
32 pore
33 plug
34 container
35 resin
37 prepreg

The invention claimed is:

1. A method for repairing a honeycomb sandwich structural body where a skin is disposed on both front and rear surfaces of a honeycomb core, comprising the steps of:
   (A) forming a repair cavity by removing the honeycomb core including a damaged portion with the skin;
   (B) inserting, into the repair cavity, a repair honeycomb core whose end surface on a side to which a repair patch is bonded is subjected to flattening treatment;
   (C) disposing the repair patch on the flattened end surface of the repair honeycomb core via an adhesive; and
   (D) bonding the repair honeycomb core to an existing portion of the honeycomb sandwich structural body and to the repair patch, and curing the repair patch under a reduced-pressure atmosphere associated with heating.

2. The method for repairing a honeycomb sandwich structural body according to claim 1, wherein in the flattening treatment, an opening of the repair honeycomb core is closed by resin that is not softened by heating in the step (D).

3. The method for repairing a honeycomb sandwich structural body according to claim 2, wherein the opening of the repair honeycomb core is closed by immersing, in resin in an uncured state, the end surface of the repair honeycomb core on the side on which the repair patch is disposed, and curing the resin.

4. A repair structure of a honeycomb sandwich structural body where a skin is disposed on both front and rear surfaces of a honeycomb core,
   wherein in a repair cavity including a first region formed by removing the skin, and a second region formed by removing the honeycomb core,
   a repair honeycomb core disposed in the second region and a repair patch disposed in the first region are bonded to each other, and
   an end surface of the repair honeycomb core on a side to which the repair patch is bonded is made flat.

5. The repair structure of a honeycomb sandwich structural body according to claim 4, wherein an adhesive is interposed between the repair honeycomb core and the repair patch.

6. The repair structure of a honeycomb sandwich structural body according to claim 4, wherein the end surface of the repair honeycomb core has an opening, and
   the opening is closed with resin.

* * * * *